United States Patent
Johnston

[11] 3,710,215
[45] Jan. 9, 1973

[54] PROGRAMMED COMMUTING POWER SOURCE FOR INVERTER MOTOR SYSTEM

[75] Inventor: Richard W. Johnston, Troy, Mich.

[73] Assignee: General Motors Corporation, Detroit, Mich.

[22] Filed: June 1, 1970

[21] Appl. No.: 42,336

[52] U.S. Cl. .................... 318/227, 318/231, 321/5, 321/45 C
[51] Int. Cl. ................................. H02p, H02m 7/52
[58] Field of Search ....318/227, 230, 231; 321/5, 45, 321/45 C

[56] References Cited

UNITED STATES PATENTS

| | | | |
|---|---|---|---|
| 3,568,021 | 3/1971 | Turnbull | 321/5 |
| 3,628,126 | 12/1971 | Kawakami | 321/45 R |
| 3,405,346 | 10/1968 | Krauthamer | 321/45 C |
| 3,414,800 | 12/1968 | Sheldrake et al. | 321/5 |
| 3,354,370 | 11/1967 | Corry et al. | 321/45 C |
| 3,384,804 | 5/1968 | Salihi | 321/45 C |

*Primary Examiner*—William H. Beha, Jr.
*Attorney*—E. W. Christen and C. R. Meland

[57] ABSTRACT

An inverter for supplying alternating current to an electrical load, such as an AC induction motor, from a direct current source. The inverter of this system includes a plurality of power controlled rectifiers which are gated conductive by a trigger logic network to provide alternating current to the electrical load. Commutation circuits comprised of community power sources, commuting capacitors, and commuting controlled rectifiers provide a means for turning-off or commutating the power controlled rectifiers. A control means is provided which regulates the output voltage of the commuting power sources inversely with the voltage level of the main direct current source. Additionally, when the inverter is used to power an AC induction motor, the output voltage of the commuting power sources is further regulated as a function of the speed of rotation of the rotor of the motor under control.

6 Claims, 8 Drawing Figures

INVENTOR.
Richard W. Johnston
BY
C.R. Meland
ATTORNEY

PROGRAMMED COMMUTING POWER SOURCE FOR INVERTER MOTOR SYSTEM

This invention relates to commutation means for a controlled rectifier supplying an electrical load from a source of direct voltage. The commutation means of this invention is particularly suited for use in an inverter which may be used to power a polyphase AC induction motor from a source of direct current. When used in an inverter, the commutation means of this invention is an improvement of the inventors disclosed in U.S. Pat. Nos. 3,354,370 and 3,384,804 assigned to the assignee of this invention.

Power controlled rectifiers used in inverters connecting a direct current source with an electrical load must be provided with commutation means to effect commutation of the power controlled rectifiers. In the past, these commutation circuits have taken the form of commuting power sources combined with commuting capacitors and commuting controlled rectifiers as is illustrated, for example, in U.S. Pat. No. 3,384,804. In these known commutation systems, a commuting controlled rectifier is gated conductive to serially connect a charged commuting capacitor and a commuting power source across the power controlled rectifier to be commuted resulting in a reverse polarity voltage being applied the cathode-anode circuit of the power controlled rectifier which causes commutation.

When the electrical load being supplied is an AC induction motor, the demands made on the commuting power sources are variable and depend both on the frequency of operation of the motor and the voltage level available at the input terminals of the inverter. Prior art systems have partially accommodated the varying demands upon the commuting power sources by the inclusion of resistors in series with the commuting power sources to limit power and the provision of power source capacitors shunted by diodes connected in shunt with the series combination of the commuting power source and resistors as disclosed in U.S. Pat. No. 3,384,804.

In inverter systems having commuting power sources which include power source capacitors, the power source capacitors are charged during the time intervals intermediate successive commutations. Subsequently, at the time of commutation, they provide energy to assist in the commutation of the power controlled rectifiers and are thereby discharged. Diodes can be provided in shunt with the source capacitors to provide a path for current flow after the charge stored in the capacitor is depleted as in U.S. Pat. No. 3,384,804.

The power source resistors employed in known inverter systems set the upper limit of power available from the commuting power source. This follows since resistors placed in series with the commuting power source determine the minimum load resistance which can be connected with the commuting power source and, accordingly, the maximum power which can be delivered by the source. This limitation is necessary to ensure against excessive power demands upon the commuting power sources during certain periods of operation. For example, excessive power demands can be realized during high frequency operation of the inverter. This excessive power demand results from the repetition rate of commutations wherein the power source capacitors are discharged during the frequent commutations and, consequently, provide a heavy load on the commuting power sources.

In contrast with the above-described known inverter systems, the commutation circuit of the present invention incorporates a programmed commuting power source for commutation of the power controlled rectifiers. With this programmed commuting power source, the voltage available from the commuting power sources is programmable and the commuting power source resistors noted above are eliminated. The maximum power delivered by each commuting power source is automatically controlled by programming the voltage level available from the commuting power source. Additionally, the programmable feature allows the elimination of the diode required to shunt the source capacitor. These improvements enhance the system capability and response.

Accordingly, it is an object of the present invention to provide a commutation system for a power controlled rectifier including a commuting power source which has a controlled output voltage which varies inversely with the level of the voltage applied to the power controlled rectifier from a main power source to thereby control the voltage applied the commuting capacitor and to control the power expended in commutation of the power controlled rectifier.

Another object of the present invention is to provide an inverter having power controlled rectifiers with a programmed commuting power source for turning-off the power controlled rectifiers wherein the magnitude of the output voltage of the commuting power source is controlled in accordance with the requirements of the system thereby allowing optimization of system component parameters. For example, the programmed commuting power sources of this invention allow the utilization of smaller commuting capacitors, commuting controlled rectifiers characterized by lower reverse voltage breakdown, and commuting power sources with lower power capability than would be required if the commuting power sources had fixed voltage outputs.

It is another object of the present invention to provide an inverter having power controlled rectifiers for supplying AC induction motors wherein a commuting power source provides a variable output voltage for commutation which is dependent both on the speed of rotation of the motor's rotor and on the voltage level of the voltage supplied the inverter at its input terminals.

An additional object of the present invention is to provide a programmed commuting power source for a controlled rectifier inverter which enhances inverter system control by improving circuit response. This object is especially important in induction motor control systems where the inverter feeding the motor is supplied a variable voltage and where the motor is operating at high speeds.

It is another object of the present invention to provide a controlled rectifier inverter with a programmed commuting power source wherein commutation is effected with a controllable power requirement from the commuting power source whereby the total power expanded in the commutation process is controlled.

Additional objects and advantages of this invention will be apparent in light of the following description. The figures listed below are incorporated in the description and illustrate a preferred embodiment of the present invention.

Figure 1:
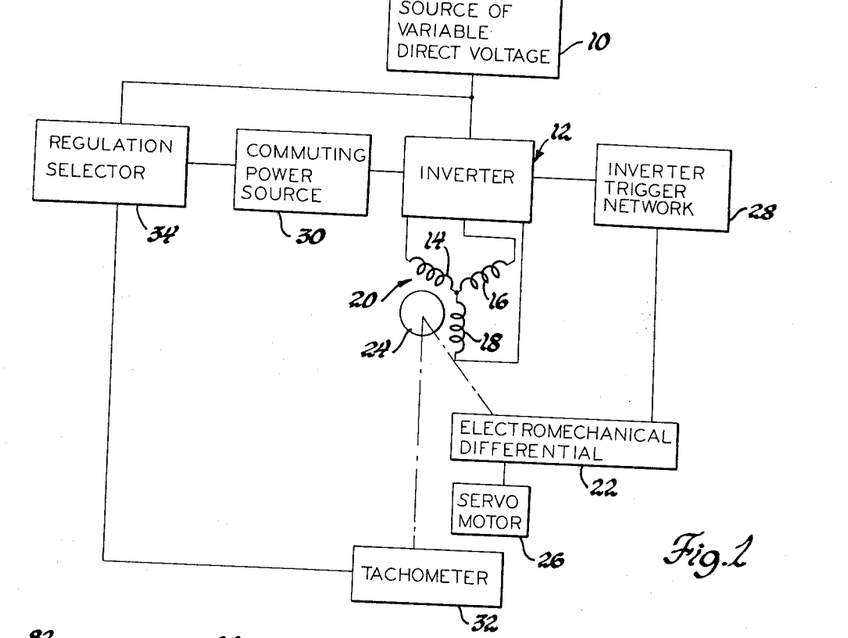
FIG. 1 is a block diagram of a motor control system using an inverter provided with the programmed commuting power supplies of this invention.

Referring now to the drawings and more particularly to FIG. 1, a controlled slip frequency motor control system is disclosed wherein a source of variable direct voltage 10 is connected with the input terminals of an inverter 12 which feeds AC power to the three phase windings 14, 16, and 18 of an AC induction motor 20. An electromechanical differential 22 is coupled with both the induction motor 20's rotor 24 and a servo motor 26. This electromechanical differential 22 develops trigger pulses which are a function of the combined speeds of rotation of the shaft of the motor 20 and the servo motor 26 and may be of the type disclosed in U.S. Pat. No. 3,471,764. Trigger pulses from the electromechanical differential 22 are coupled to an inverter trigger network 28 where they are rendered effective as switching pulses to the inverter 12. Thus, direct current from the source of variable direct voltage 10 is connected with the various motor phase windings in response to the inverter trigger 28 which controls the output frequency of the inverter 12.

In this manner, the slip frequency of the induction motor 20 is controlled in accordance with the signal developed by the electromechanical differential 22 which, in turn, is dependent on the combined speeds of rotation of the shaft of the motor 20 and the servo motor 26. It should be appreciated that the differential 22 can take various forms, in addition to that disclosed in U.S. Pat. No. 3,471,764 which are generally known in the art, of controlled slip frequency motor systems.

As noted above, the inverter trigger network 28 provides trigger pulses to gate the controlled rectifiers of inverter 12. Various trigger arrangements are known which can be utilized to provide the necessary gate trigger pulses. One such system includes a shift register, trigger monostable multivibrators, and gating-trigger electronics to produce sequential and periodic trigger pulses. As these networks are generally known in various forms and since the trigger network is not a part of this invention, it will not be described in detail.

The present invention is directed to a commutation system which includes the commuting power sources 30 of FIG. 1 to facilitate commutation of the power controlled rectifiers of inverter 12. The commuting power sources 30 provide a voltage level for use in commutation which is regulated either by a signal from the tachometer 32 or by a signal representative of the voltage level applied to the input terminals of inverter 12. This regulation is accomplished by selecting as an instantaneous control either the voltage indicative of the level of the voltage at the input terminals of the inverter 12 or the voltage indicative of motor speed which is developed by a frequency to voltage transformation of the variable frequency tachometer signal available from the tachometer 32 coupled to the rotor 24 of the motor 20. As shown in FIG. 1, a regulation selector 34 elects the instantaneous regulation parameter, either the speed of rotation of the rotor 24 as indicated by the tachometer 32 or the voltage applied from the source of variable direct voltage 10 to the input terminals of inverter 12. Thus, the commuting power sources 30 provide a voltage level which is controlled by the requirements of the circuit. The specifics of the commuting power sources 30 together with regulation circuitry necessary to control these voltage levels are discussed hereinafter with the aid of FIGS. 5, 6, and 7. It should be appreciated that the slip speed control system of FIG. 1 is merely an illustrative example of an application for the present invention. The programming concept of the present invention could be incorporated in a motor feed system without slip speed regulation. Additionally, the programming concept of the present invention could be incorporated in other electrical systems wherein a controlled rectifier is utilized to power an electrical load from a direct voltage source necessitating periodic commutation of the controlled rectifier.

Figure 2:
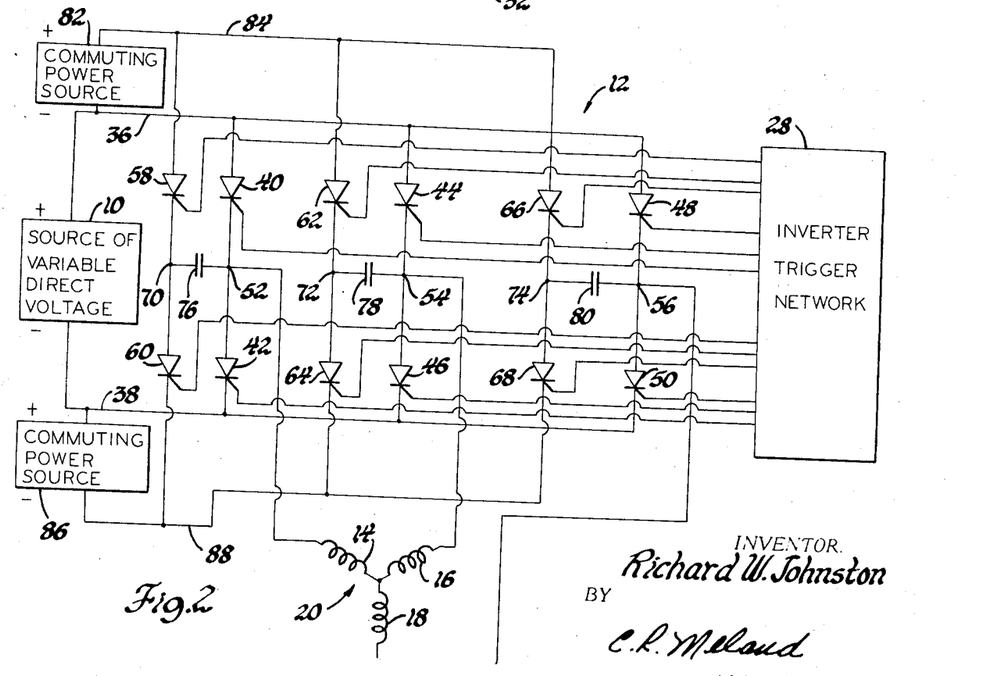
FIG. 2 is a circuit schematic of a controlled rectifier inverter made in accordance with this invention which can be used in the system of FIG. 1.

Referring now to FIG. 2 which discloses in detail the inverter 12 of FIG. 1, the source of variable direct voltage 10 is seen to feed input conductors 36 and 38 which in turn are connected with power controlled rectifiers 40, 42, 44, 46, 48, and 50. The source of variable direct voltage 10 can take various forms, for example, it can take the form of a controlled rectifier full-wave bridge network connected with an AC source wherein the conduction periods for the controlled rectifiers determine the voltage level. In the alternative, the source 10 can be a fixed voltage source of direct voltage coupled with a pulse modulator. Other means for providing variable voltage direct voltage sources are known and would be adaptable for use in the FIG. 2 network.

Continuing the explanation of FIG. 2, it is seen that terminals 52, 54, and 56 provide output terminals for the inverter 12. These terminals are connected respectively with the phase windings 14, 16, and 18 of the AC induction motor 20. In this manner, the motor 20 can be supplied AC voltage from the source of variable direct voltage 10.

Commuting controlled rectifiers 58, 60, 62, 64, 66, and 68 are provided to effect commutation of the power controlled rectifiers 40 through 50. The commuting controlled rectifiers are combined in pairs as shown in FIG. 2 with terminals 70, 72, and 74 at the anode-cathode junctions of the three pairs. Commuting capacitors 76, 78, and 80 are respectively connected between the terminals 70 and 52, 72 and 54, and 74 and 56.

The output of a commuting direct current power source 82 is provided with its negative terminal connected with the conductor 36. Conductor 84 connects the positive terminal of the output of the commuting power source 82 with the anodes of commuting controlled rectifiers 58, 62, and 66. The positive output terminal of a commuting power source 86 is connected with the conductor 38. A conductor 88 connects the negative terminal of the commuting power source output 86 with the cathodes of the commuting controlled rectifiers 60, 64, and 68. The precise configuration of the two commuting power sources 82 and 86 is detailed hereinafter in conjunction with FIGS. 5 and 6.

Figure 3:
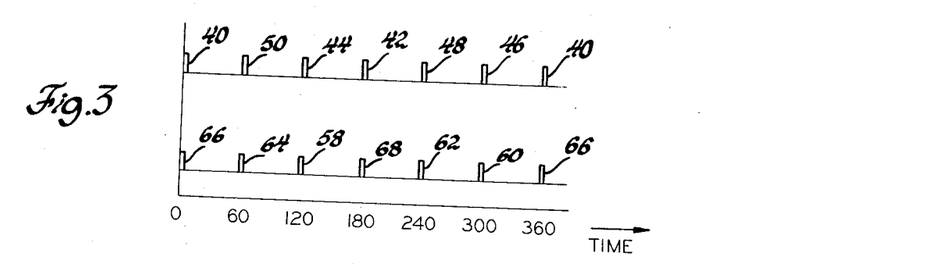
FIG. 3 is a graph illustrating the sequence of pulses for controlling the controlled rectifiers of the inverter illustrated in FIG. 2.

In operation, the inverter of FIG. 2 provides variable frequency and variable voltage alternating current to the induction motor 20 from variable direct voltage source 10. The gate and cathode electrodes of the power controlled rectifiers 40 through 50 are periodically provided trigger pulses similar to those shown in FIG. 3 by a conventional inverter trigger circuit 28. As shown in the graph of FIG. 3, the trigger pulses are time displaced by 60 electrical degrees. These pulses are keyed with their respective controlled rectifiers of FIG. 2 in that they carry like reference numerals.

By considering FIG. 3 in conjunction with FIG. 2, it will be appreciated that when pulse 40 is applied to the gate and cathode of the power controlled rectifier 40, this power controlled rectifier will be rendered conductive. Similarly, when pulse 50 is applied to the gate and cathode of power controlled rectifier 50, this power controlled rectifier will be rendered conductive. While this pair of power controlled rectifiers is conductive, a circuit is completed which includes the direct voltage source 10, the power controlled rectifier 40, motor phase windings 14 and 18, and power controlled rectifier 50. Accordingly, the phase windings 14 and 18 are energized between 60 electrical degrees and 120 electrical degrees. This energization period is shown graphically in FIG. 4 wherein the energizations of all three phase windings are graphically illustrated. The precise waveform associated with the energy supplied the reactive motor load various somewhat from an ideal square wave which would accompany energization of a purely resistive load.

In like manner, other conductive paths are completed by gating various pairs of the power controlled rectifiers 40 through 50. Accordingly, the phase windings are provided three phase power in the manner illustrated in FIG. 4. The frequency of operation depends on the trigger frequency, and, ultimately, is determined by the output of the electromagnetic differential 22 noted above and in FIG. 1.

Commutation of the power controlled rectifiers 40 through 50 is effected by the commutation circuits which include the commuting controlled rectifiers 58 to 68, the commuting power sources 82 and 86, and the commuting capacitors 76, 78, and 80. The commutation sequence is determined by the trigger sequence provided the commuting controlled rectifiers 58 through 68 of FIG. 2 by the inverter trigger 28. This trigger sequence is shown graphically in FIG. 3. For example, the power controlled rectifier 40 is rendered nonconductive when commuting controlled rectifier 58 is gated conductive by the control pulse 58 shown in FIG. 3. A comparison of FIGS. 3 and 4 reveals that the controlled rectifier 40 provided a positive power pulse to phase winding 14 from its turn-on point at zero electrical degrees until it was rendered nonconductive by commuting controlled rectifier 58 at 120 electrical degrees. In like manner, commuting controlled rectifier 60 causes power controlled rectifier 42 to cease conduction when commuting controlled rectifier 60 is gated conductive. In a similar fashion, the remaining power controlled rectifiers are turned off by their respective commuting controlled rectifiers.

The precise manner in which a power controlled rectifier is turned off by its respective commuting controlled rectifier is as follows. Consider the situation wherein power controlled rectifier 40 is conductive. Commuting controlled rectifier 58 is gated conductive to cause the commutation of power controlled rectifier 40. Commuting capacitor 76 is initially charged with a positive charge on the plate connected with terminal 52. Thus, when the commuting controlled rectifier 58 is gated conductive, a shut off path is provided which includes the commuting power source 82 in series with the commuting rectifier 58, the commuting capacitor 76, and the power controlled rectifier 40. This series combination including power controlled rectifier 40 provides a reverse bias to cause the cessation of current conduction through the power controlled rectifier 40 by discharge of capacitor 70. When the power controlled rectifier 40 ceases conduction, the commutation circuit continues to supply energy to the motor phase winding 14. The circuit for supplying energy to the motor winding comprises the series combination of the main direct voltage source 10, commuting power source 82, commuting controlled rectifier 58, commuting capacitor 76, motor phase windings 14 and 18, and power controlled rectifier 50. This process of supplying energy continues until the commuting capacitor 76 has attained a charge sufficient to shut off commuting controlled rectifier 58. In this manner, the commuting capacitor 76 has attained a positive charge on the plate connected with terminal 70. It is now set for the commutation of power controlled rectifier 42. After power controlled rectifier 42 has been shut off, the continued conduction through the motor and the commutation circuit including the commuting controlled rectifier 60 provides a mechanism whereby the capacitor 76 will be recharged such that its plate connected with terminal 52 will have a positive polarity and will be proper for the commutation of power controlled rectifier 40.

Figure 4:
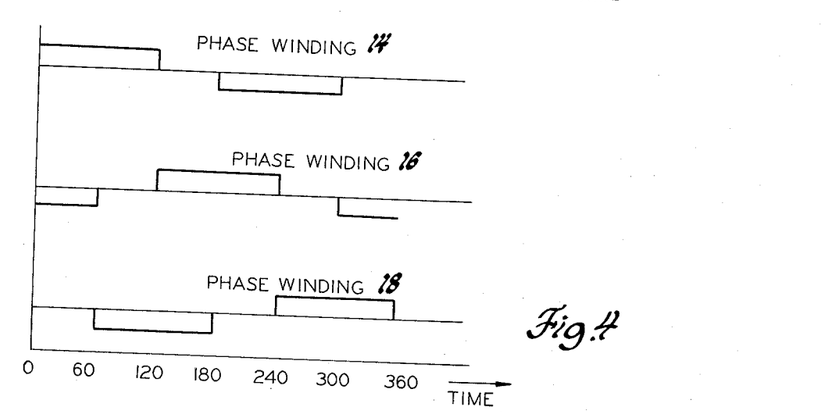
FIG. 4 is a diagram illustrating the output current of a three phase inverter of the type shown in FIG. 2.

In summary, the train of pulses shown in FIG. 3 is representative of those applied to the various controlled rectifiers of the inverter in FIG. 2 such that the power controlled rectifiers are sequentially gated conductive and rendered nonconductive to provide energization for the phase windings of the motor in accordance with the graph of FIG. 4.

Figure 5:
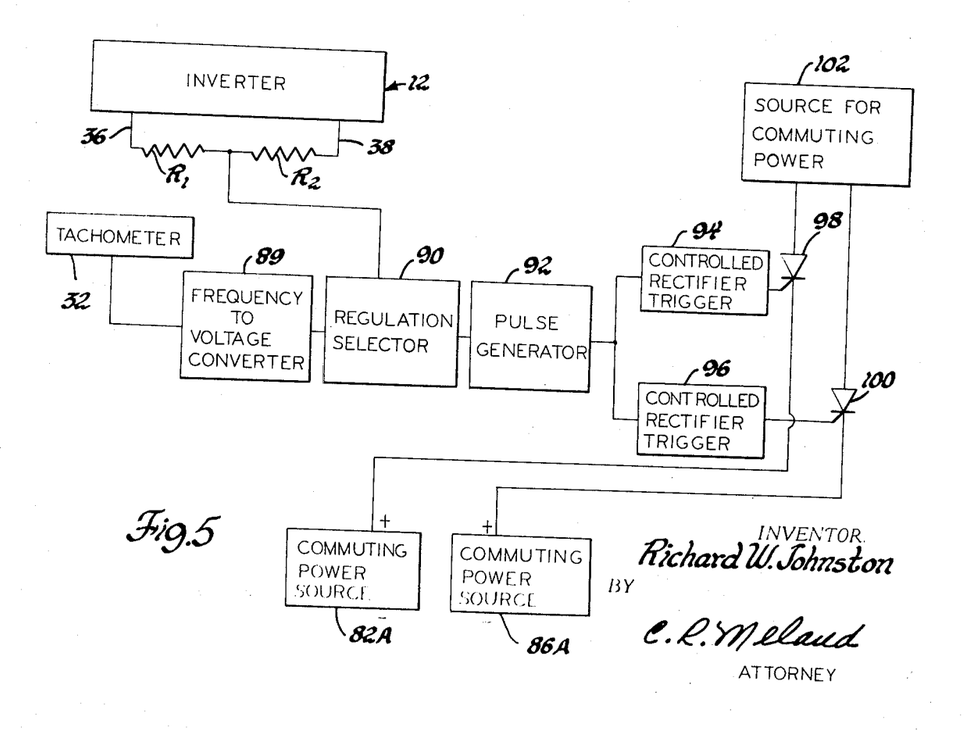
FIG. 5 is a block diagram of a control network suitable to program the voltages of the commuting power sources of FIG. 2.

Referring now to FIG. 5, a block diagram schematic of a system for controlling the output voltage of the commuting power sources 82 and 86 of FIG. 2 is disclosed. In this system, variable voltage outputs 82A and 86A which depend both on the voltage level of the input voltage supplied inverter 12 by conductors 36 and 38 and upon the speed of rotation of the motor under control are detected by the tachometer 32 are provided. It is appreciated, as noted above, that this commuting power source programming system has general application and can be utilized in supply networks not intended to power motors. In these applications, the tachometer control would be deleted.

Continuing the explanation of FIG. 5, a conventional frequency to voltage block converter 89 transforms a variable frequency tachometer input signal from tachometer 32 to a voltage whose magnitude is a function of the speed of rotation of the motor's rotor. This voltage indication of rotor speed is combined with a voltage indication of the voltage level on the input conductors 36 and 38 of the inverter 12 in a regulation selector 90. As shown in FIG. 5, the voltage level on the input conductors of inverter 12 is measured by a voltage divider network comprised of two series connected resistors $R_1$ and $R_2$ connected across the input conductors 36 and 38 of the inverter 12.

The regulation selector 90 elects one of the two voltage signals as the dominant instantaneous control. Accordingly, the output from the regulation selector 90 will be related to either the voltage level at the input to the inverter or the rotor speed of rotation as determined by the tachometer. The choice between these two control functions can vary automatically from moment to moment as conditions in the system vary.

The control signal voltage from the regulation selector 90 is supplied to a pulse generator 92 to determine the point in each cycle of the generator's output signal at which the pulses provided by the pulse generator will commence. The pulse generator 92 has a constant frequency of operation independent of the voltage level available from the regulation selector 90; only the duty cycle is affected by voltage variations. In this manner, control pulses are produced which are regulated by both the speed of rotation of the motor's rotor and the voltage level at the input to the inverter. The pulse generator 92 supplies these control pulses to two identical controlled rectifier trigger circuits 94 and 96 which provide gating signals to two controlled rectifiers 98 and 100. A direct current source for commuting power 102 is connected with both controlled rectifiers 98 and 100 to provide power at the outputs 82A and 86A of the commuting power sources. The trigger networks 94 and 96 determine the percentage on-time for their respective controlled rectifiers and, accordingly, determine the output voltage provided by the programmed commuting power sources at the outputs 82A and 86A. Accordingly, programmed voltage outputs are available to be employed for commutation of the power controlled rectifiers of the inverter 12 of FIGS. 1 and 2. These commuting power sources 82 and 86 are shown in FIG. 2 and their function in the commutation process is detailed above.

Figure 6A:
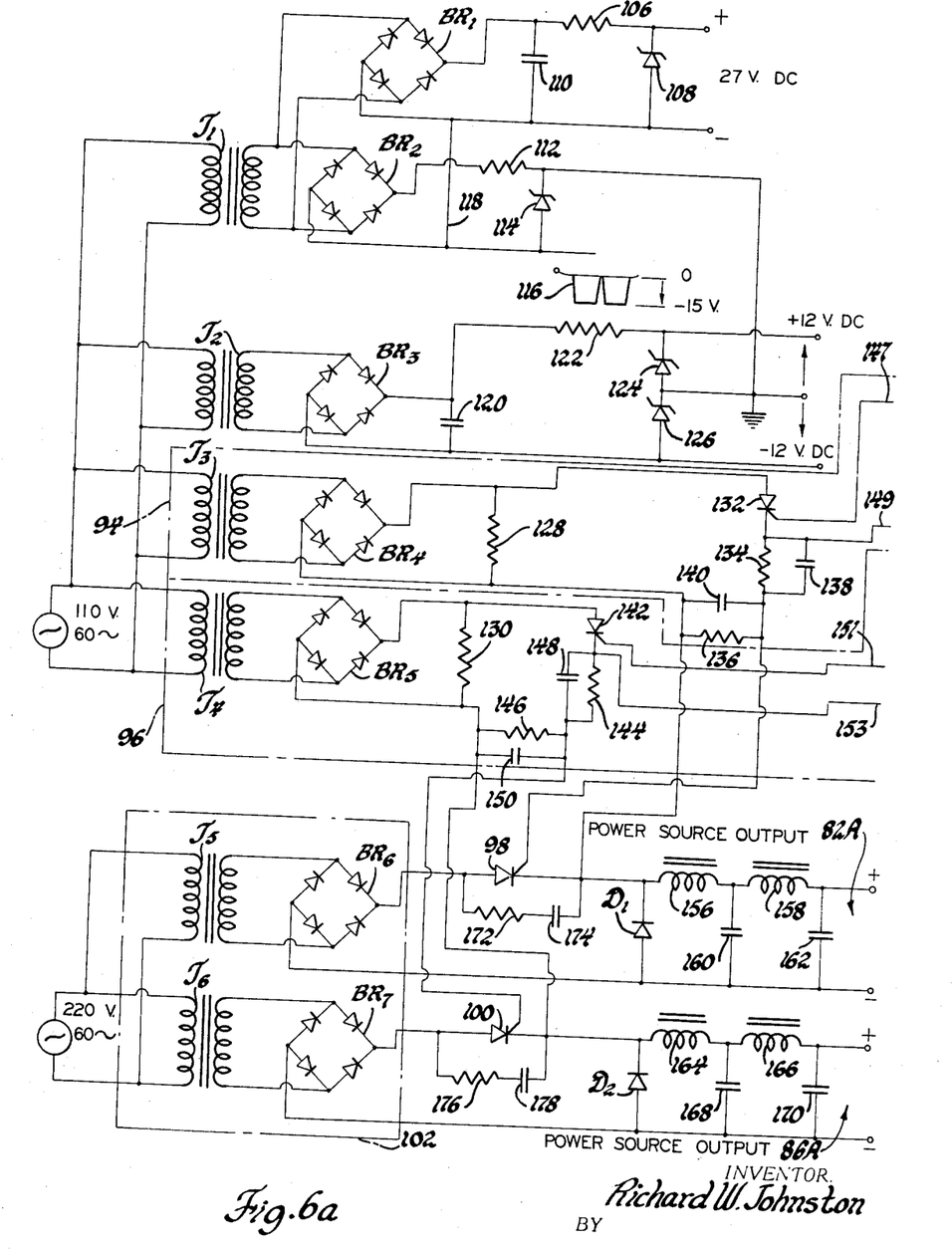
FIGS. 6a and 6b taken together are a circuit schematic of a control network conforming with the block diagram of FIG. 5.
Figure 6B:
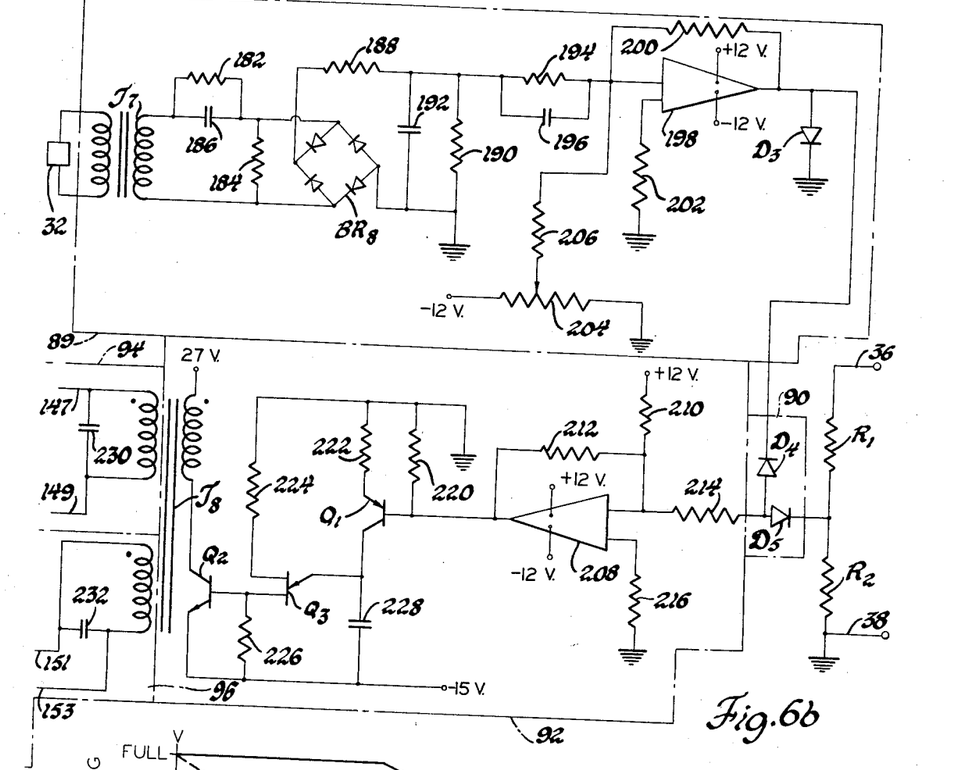

A detailed circuit schematic of the block diagram set forth in FIG. 5 is disclosed in the composite of FIGS. 6a and 6b. In the schematic of FIGS. 6a and 6b, various blocks are indicated and labeled to agree with the block diagram of FIG. 5. Thus, it is seen that programmable voltages for the commuting power sources are provided at the source outputs 82A and 86A by the circuit shown in FIG. 6a with the programmable voltages dependent upon the percentage on-time of the controlled rectifiers 98 and 100. These controlled rectifiers 98 and 100 are in turn dependent on triggers 94 and 96 for gate signals which determine the conduction periods of the controlled rectifiers 98 and 100. In order to gate controlled rectifiers in the triggers 94 and 96, pulse generator 92 shown in FIG. 6b provides a control input to the two triggers 94 and 96. In FIG. 6b as in FIG. 5, the pulse generator 92 is controlled by a signal from regulation selector 90, which takes the form of an "OR" logic gate, which in turn is connected with a voltage divider which measures the inverter input voltage on conductors 36 and 38 and a frequency to voltage converter 89 connected with the tachometer 32. Accordingly, the circuit composite of FIGS. 6a and 6b discloses a particular circuit configuration for carrying forward the present invention.

In FIG. 6a, AC 60 cycle power is utilized to power the various circuits of the commuting power source network. A 110 volt AC 60 cycle source is shown in FIG. 6a connected with four transformers $T_1$, $T_2$, $T_3$, and $T_4$. Five full wave bridge rectifier networks $BR_1$, $BR_2$, $BR_3$, $BR_4$, and $BR_5$ are connected with the secondary windings of these four transformers to provide DC power for the various circuit components.

The secondary winding of transformer $T_1$ is connected with two full wave bridge rectifiers $BR_1$ and $BR_2$. The output of bridge rectifier $BR_1$ provides a 27 volt DC level regulated by Zener dropping resistor 106 and Zener diode 108. A capacitor 110 provides filter action to improve the DC character of the waveform at the output of this DC supply. Bridge rectifier $BR_2$ is connected at its output with a Zener dropping resistor 112 and a Zener diode 114 and, accordingly, provides a clipped sinusoid with a voltage varying from zero to −15 volts. The waveform of this clipped sinusoid is shown as waveform 116 in FIG. 6a. A conductor 118 connects two terminals of the power supplies which include bridge rectifiers $BR_1$ and $BR_2$ to adapt them for connection in the control network.

Full wave bridge rectifier $BR_3$ has its input connected with the secondary winding of transformer $T_2$ and its output connected with a filter capacitor 120 and a Zener dropping resistor 122. A pair of Zener diodes 124 and 126 serve as a voltage divider allowing +12 volt DC and −12 volt DC supply levels to be provided by this power supply.

Two full wave bridge rectifiers $BR_4$ and $BR_5$ are connected, respectively, with the secondary windings of the transformers $T_3$ and $T_4$. These bridge rectifiers are included in the two trigger networks 94 and 96 and provide power for the trigger functions. A pair of resistors 128 and 130 are connected respectively with the output terminals of these full wave bridge rectifiers to provide a continuous load for the full wave rectified sinusoids which are available at their outputs. Controlled rectifier 132 is connected with the output of bridge rectifier $BR_4$ serially with two shunt RC circuits which include resistors 134 and 136 and capacitors 138 and 140. Controlled rectifier 142 is connected with the output of bridge rectifier $BR_5$ serially with two shunt RC circuits which include resistors 144 and 146 and capacitors 148 and 150. The shunt combinations of resistor 134-capacitor 138 and resistor 144-capacitor 148 provide a fast rise for signals applied through the controlled rectifiers 132 and 142 to the shunt combinations of resistor 136-capacitor 140 and resistor 146-capacitor 150. The gate cathode control circuits of controlled rectifiers 98 and 100 are connected respectively with the shunt combinations of resistor 136- capacitor 140 and resistor 146-capacitor 150. The gate cathode control circuits of controlled rectifiers 132 and 142 are connected by transformer coupling with the pulse generator 92. This connection is completed by conductors 147, 149, 151, and 153 shown in FIGS. 6a and 6b. These conductors are the only interconnections between the two figures.

A 220 volt AC 60 cycle power source provides electrical energy to the primary windings of transformers $T_5$ and $T_6$ included in the source 102 for providing commuting power in FIG. 6a. Full wave bridge rectifier networks $BR_6$ and $BR_7$ are respectively connected with the secondary windings of these transformers $T_5$ and $T_6$. Each of the full wave bridge rectifier networks $BR_6$ and $BR_7$ is connected through its respective controlled rectifier, either controlled rectifier 98 or controlled rectifier 100, to a two section LC filter network. The LC filter network connected with controlled rectifier 98 is comprised of an inductor 156, an inductor 158, a capacitor 160, and a capacitor 162. The filter network connected with controlled rectifier 100 is comprised of an inductor 164, an inductor 166, a capacitor 168, and a capacitor 170. The outputs 82A and 86A from the two filter networks provide the output voltages of the commuting power sources 82 and 86 hereinabove cited with reference to FIG. 2. Each of the controlled rectifiers 98 and 100 is shunted by a series RC combination. Controlled rectifier 98 being shunted by resistor 172 in series with capacitor 174 and controlled rectifier 100 being shunted by resistor 176 in series with capacitor 178. Additionally, the two two-section LC filters are shunted, respectively, by the diodes $D_1$ and $D_2$.

In operation, the commuting power sources have programmable voltages available at the outputs of the commuting power sources denoted 82A and 86A, in FIG. 6a, which are dependent upon the percentage on-time of the controlled rectifiers 98 and 100. The conduction periods of the controlled rectifiers 98 and 100 are determined by the timing of gate signals developed in the trigger circuits which include controlled rectifiers 132 and 142. Since the controlled rectifiers 98 and 100 are supplied full wave rectified sinusoidal voltage, they are self-commutating and there is no need for auxiliary shut-off means. Accordingly, the particular turn-on point as determined by the controlled rectifiers 132 and 142 will regulate the voltages at the outputs 82A and 86A.

The gate control for controlled rectifiers 132 and 142 will now be described. A tachometer 32 is connected to a frequency to voltage converter 89 by connection with the primary winding of a transformer $T_7$ as shown in FIG. 6b. Resistors 182 and 184 and capacitor 186 cooperate to differentiate and calibrate the signal available from the secondary winding of the transformer $T_7$. In this manner, the range and slope of tachometer control are regulated. The voltage signal developed across the resistor 184 is coupled through a full wave bridge rectifier network $BR_8$ with a limiter and an integrator comprised of resistors 188 and 190 and capacitor 192. Additional calibration is afforded by this limiter and integrator.

For amplification, the voltage signal developed across the resistor 190 is connected through the shunt combination of a resistor 194 and a capacitor 196 with a conventional operational amplifier 198. This amplifier circuit includes in addition to operational amplifier 198, a resistor 200, a resistor 202, a variable resistor 204, and a resistor 206 as well as the operational amplifier itself and the requisite bias voltages. The +12 volt DC and −12 volt DC bias voltages required in this amplifier circuit are obtained from the DC power supply cited above and shown in FIG. 6a which includes transformer $t_2$ and full wave bridge rectifier $BR_3$. A diode $D_3$ ensures that the output of the operational amplifier 198 does not assume a positive value. The variable resistor 204 together with its −12 volt bias voltage comprises a threshold adjustment to calibrate the operational amplifier. Operational amplifiers such as that incorporated in this amplifier network are commercially available and are characterized by a high input impedance, a low output impedance, and high gain capability. Accordingly, the specifics of this operational amplifier are not disclosed herein.

As previously pointed out, a voltage divider network comprised of the resistors $R_1$ and $R_2$ is connected with conductors 36 and 38 which provide input voltage to the inverter supplying power to the electrical load under control. The tap point selected is determined by the control characteristics required.

A pair of diodes $D_4$ and $D_5$ having their anodes connected together and their cathodes connected respectively with the inverter input voltage indicator $R_1$ and $R_2$ and the tachometer indicator 32 comprise the regulation selector 90 shown in FIG. 5. This diode arrangement constitutes an OR circuit for selecting the instantaneous control. This regulation selector 90 in FIG. 6b supplies an input to a conventional operational amplifier 208 which is included in the pulse generator 92. As noted above, operational amplifiers are characterized by a high input impedance, a low output impedance, and a capability for high gain. Four resistors 210, 212, 214, and 216 complement the operational amplifier in providing the necessary voltage amplification. The +12 volt DC and −12 volt DC bias voltages required by the amplifier are obtained from the DC power supply cited above and shown in FIG. 6a which includes transformer $T_2$ and full wave bridge rectifier $BR_3$. Both the tachometer signal and the input voltage level of the inverter input are capable of affecting the input level to the operational amplifier 208 since the diodes $D_4$ and $D_5$ connect both control parameters with the input of the operational amplifier.

In operation, the pulse generator network converts the voltage available at the output of the operational amplifier 208 to a series of pulses. The pulse amplifier is a relaxation oscillator of conventional design and includes transistors $Q_1$ and $Q_2$ and unijunction transistor $Q_3$. In addition, resistors 220, 222, 224, 226, and capacitor 228 are employed in the pulse generator circuit. The 15 volt bias supplied directly to the emitter of transistor $Q_2$ and to a base of the unijunction transistor $Q_3$ through the resistor 226 and to one plate of the capacitor 228 is represented by the voltage waveform 116 of FIG. 6a. As depicted at the output of the bridge rectifying network $BR_2$, the signal 116 is a clipped full wave rectified sinusoid. Accordingly, the signal is synchronized with the line voltage applied to the inputs of the various transformers $T_1$ through $T_6$. A pulse transformer $T_8$ couples the pulse output of the pulse generator with the gate-cathode electrodes of controlled rectifiers 132 and 142 in the trigger circuits 94 and 96. The 27 volt bias voltage connected with the transformer $T_8$ is derived from the 27 volt DC source of FIG. 6a which includes transformer $T_1$ and bridge rectifier $BR_1$ as described above. Two capacitors 230 and 232 are connected across the secondary windings of the pulse transformer $T_8$ to filter the signal available on the trigger leads. As noted above, conductors 147, 149, 151, and 153 interconnect the circuitry of FIG. 6b with the circuitry of FIG. 6a.

Accordingly, the controlled rectifiers 132 and 142 shown in FIG. 6a are gated conductive by signals developed in the pulse generator 92 shown in FIG. 6b. As noted above, the pulse generator circuit connected with the primary of the pulse transformer $T_8$ has a bias supply represented by waveform 116 which is synchronized with the full wave rectified voltage applied to the controlled rectifiers 132 and 142. Thus, the turn-on point for the controlled rectifiers 132 and 142 is determined by the voltage level available at the output of the operational amplifier since this DC voltage level determines the point on each half wave of the waveform 118 at which the pulse amplifier develops a pulse. This control voltage level is in turn a function of both the speed of rotation of the motor's rotor and the voltage level of the input voltage to the inverter which supplies the motor. Since the full wave rectified outputs from the bridge rectifiers $BR_6$ and $BR_7$ are synchronized with the outputs from the bridges $BR_4$ and $BR_5$, the percentage on-time for controlled rectifiers 98 and 100, which as noted above are gated conductive by controlled rectifiers 132 and 142, is controlled and the voltage level at the outputs 82A and 86A is also controlled.

Figure 7:
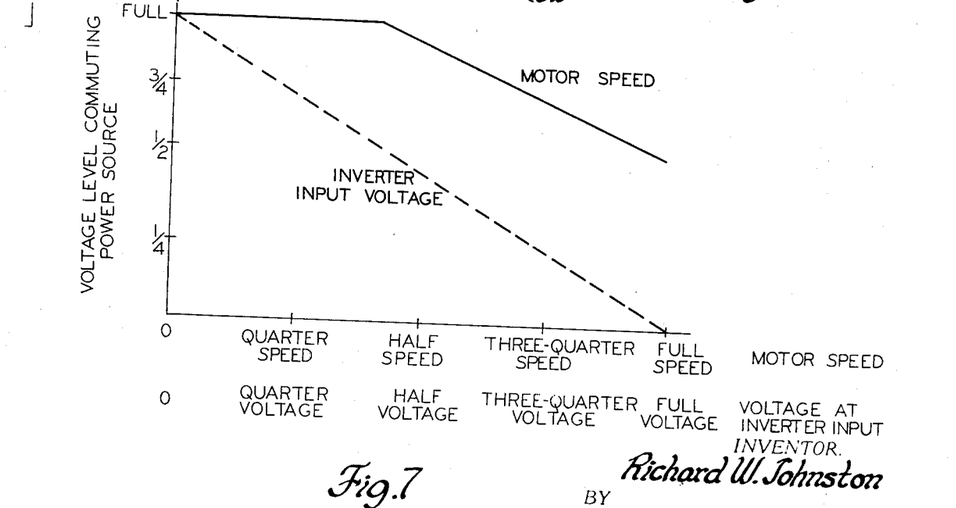
FIG. 7 shows graphically the characteristics of the programmable commuting power sources.

By way of summary, FIG. 7 shows graphically the characteristics of the programmable commuting power source outputs 82A and 86A of FIG. 6a. The vertical axis of the graph of FIG. 7 represents the voltage level of the commuting power sources. The horizontal axis of the graph of FIG. 7 has two scales: the first scale represents the speed of rotation of the motor's rotor; the second scale represents the voltage level at the input to the inverter which energizes the motor under control. The solid curve in FIG. 7 illustrates the relationship between the voltage level of the commuting power source and the speed of rotation of the rotor. The dashed curve in the graph represents the relationship between the voltage level of the commuting power sources and the voltage level at the input to the inverter. In operation, the voltage level of the commuting power sources is controlled as explained above and the instantaneous voltage level of the commuting power sources is regulated in accordance with both the representations of the graph of FIG. 7.

In operation, the motor speed and the amplitude of the voltage at the inverter input terminals are independent parameters. Accordingly, at any given motor speed the inverter input voltage can have any value on the dashed curve of FIG. 7. The instantaneous amplitude of the commuting power sources will be the lower of the two amplitudes associated with the instantaneous motor speed and the instantaneous amplitude of the inverter input voltage. Thus, at full speed and zero voltage input to the inverter input terminals, the amplitude of the commuting power sources will be ½ voltage as dictated by the motor speed curve; whereas, at full speed and full voltage input to the inverter input terminals, the amplitude of the commuting power sources will be zero voltage as dictated by the inverter input voltage curve. The amplitude of the commutating power sources for other motor speed-inverter input voltage operating points is obtained from the FIG. 7 graph in like manner. As noted above, the instantaneous election of the dominant control, either motor speed or inverter input voltage, is performed automatically by the OR circuit 90 of FIG. 6b. It is noted that the graph of FIG. 7 is merely an example of the control relationships shown therein without any limitation as to alternative functional relations.

From the foregoing, it should be appreciated that the tachometer control feature affords regulation of the amplitude of the commuting power sources in accordance with the repetition rate of switching the power controlled rectifiers of the inverter. That this is so, follows from the relationship between the speed of rotation of an induction motor's rotor and the frequency of the electrical power supplied the induction motor. Thus, measurement of the speed of rotation of the motor's rotor is tantamount to measurement of the frequency of the power supplied the motor from the inverter and, accordingly, the repetition rate of switching the power controlled rectifiers.

It is appreciated that the particular circuit configuration of FIGS. 6a and 6b is merely one means for carrying forward the present invention. It is included as a preferred embodiment without any limitation as to alternative circuit arrangements for providing the variable voltage commuting power sources of FIG. 2.

I claim:

1. An electrical power supply system, comprising: a source of direct voltage; an electrical circuit comprising a power controlled rectifier and an electrical load; means connecting said source of direct voltage with said electrical circuit to provide electrical power to said electrical load from said source of direct voltage through said power controlled rectifier; a commuting switching means; a commuting capacitor; a variable output voltage commuting power source; means connecting said commuting power source, said commuting capacitor and said commuting switching means with said power controlled rectifier in a commutation circuit to turn off said power controlled rectifier when said commuting switching means is rendered conductive; said commutation circuit serially applying both the voltage of the commuting capacitor and the voltage of the commuting power source across said power controlled rectifier to reverse bias said power controlled rectifier and cause cessation of conduction in said power controlled rectifier; a sensing means providing a signal representative of the repetition rate of switching said power controlled rectifier; and means connected with said sensing means and said commuting power source for controlling the amplitude of the output voltage of said commuting power source as a function of the repetition rate of switching said power controlled rectifier.

2. An inverter power supply system for supplying an electrical load from a source of direct voltage, comprising: a source of variable direct voltage; an inverter including a plurality of serially connected pairs of power controlled rectifiers and a plurality of serially connected pairs of commuting controlled rectifiers, said inverter having an input coupled with said source of variable direct voltage and an output connected with said electrical load; a plurality of commuting capacitors; means connecting said commuting capacitors respectively between the junctions of said pairs of power controlled rectifiers and the junctions of said pairs of commuting controlled rectifiers; a plurality of variable output voltage commuting power sources, each commuting power source being connected in a series circuit path including a respective commuting capacitor, power controlled rectifier and commuting controlled rectifier to provide a shut-off path for turning off a particular power controlled rectifier when a particular commuting controlled rectifier is gated conductive; means coupled with said commuting power sources and said inverter input for controlling the output voltages of said commuting power sources as a function of the input voltage of said inverter, and means responsive to the switching rate of said power controlled rectifiers for at times controlling the output voltages of said commuting power sources.

3. An inverter power supply system for supplying an AC induction motor from a source of direct voltage, comprising: a source of direct voltage; an inverter including a plurality of serially connected pairs of power controlled rectifiers and a plurality of serially connected pairs of commuting controlled rectifiers, said inverter having an input coupled with said source of direct voltage and an output connected with said induction motor; a plurality of commuting capacitors; means connecting said commuting capacitors respectively between the junctions of said pairs of power controlled rectifiers and the junctions of said pairs of commuting controlled rectifiers; a plurality of variable output voltage commuting power sources, each commuting power source being connected in a series circuit path including a respective commuting capacitor, power controlled rectifier and commuting controlled rectifier to provide a shut-off path for turning off a particular power controlled rectifier when a particular commuting controlled rectifier is gated conductive; sensing means coupled with said induction motor capable of providing a signal indicative of the speed of rotation of the motor's rotor; and means coupled with said commuting power sources and said sensing means for controlling the output voltages of said commuting power sources as a function of the operating speed of said induction motor.

4. An inverter power supply system for supplying an AC induction motor from a source of variable direct voltage, comprising: a source of variable direct voltage; an inverter including a plurality of serially connected pairs of power controlled rectifiers and a plurality of serially connected pairs of commuting controlled rectifiers, said inverter having an input coupled with said source of variable direct voltage and an output connected with said induction motor; a plurality of commuting capacitors; means connecting said commuting capacitors respectively between the junctions of said pairs of power controlled rectifiers and the junctions of said pairs of commuting controlled rectifiers; a plurality of variable output voltage commuting power sources, each commuting power source being connected in a series circuit path including a respective commuting capacitor, power controlled rectifier and commuting controlled rectifier to provide a shut-off path for turning off a particular power controlled rectifier when a particular commuting controlled rectifier is gated conductive; first sensing means coupled with said inverter input to provide a signal indicative of the amplitude of the inverter input voltage; second sensing means coupled with said induction motor to provide a signal indicative of the speed of rotation of the motor's rotor; and control means coupled with said commuting power sources and both said first sensing means and said second sensing means for controlling the output voltages of said commuting power sources in a generally inverse relation with both the amplitude of said inverter input voltage and the speed of operation of said induction motor.

5. An inverter power supply system for supplying an AC induction motor from a source of variable direct voltage, comprising: a source of variable direct voltage; an inverter including a plurality of serially connected pairs of power controlled rectifiers and a plurality of serially connected pairs of commuting controlled rectifiers, said inverter having an input coupled with said source of variable direct voltage and an output connected with said induction motor; a plurality of commuting capacitors; means connecting said commuting capacitors respectively between the junctions of said pairs of power controlled rectifiers and the junctions of said pairs of commuting controlled rectifiers; a plurality of variable output voltage commuting power sources, each commuting power source being connected in a series circuit path including a respective commuting capacitor, power controlled rectifier and commuting controlled rectifier to provide a shut-off path for turning off a particular power controlled rectifier when a particular commuting controlled rectifier is gated conductive; regulation selector means coupled with said inverter input and with said induction motor capable of providing a signal related either to the amplitude of the inverter input voltage or to the speed of rotation of the motor's rotor; and control means coupled with said commuting power sources and said regulation selector means for controlling the output voltages of said commuting power sources in a generally inverse relation with both the amplitude of said inverter input voltage and the speed of operation of said induction motor.

6. An inverter power supply system for supplying an AC induction motor which includes commuting controlled rectifiers, variable output voltage commuting power sources and commuting capacitors arranged in commutation circuits wherein the output voltage amplitudes of the commuting power sources is controlled by a control network, comprising: a controlled rectifier in each of said variable output voltage commuting power sources, full wave rectified AC voltage being applied to each of said controlled rectifiers, each of said controlled rectifiers controlling the amplitude of the voltage of its respective commuting power source according to the percentage conduction time of said controlled rectifier, the percentage conduction time of each of said controlled rectifier being determined by the point on the half wave sinusoid at which the controlled rectifier is gated conductive, commutation of said controlled rectifiers being inherent as a consequence of application of full wave rectified sinusoidal voltage; a plurality of controlled rectifier gating means, each of said gating means being connected with one of said controlled rectifiers in said commuting power sources, each of said gating means capable of providing a gate signal to its respective controlled rectifier in response to an input pulse; a pulse generator connected with each of said plurality of gating means to provide periodic pulses to initiate conduction in said controlled rectifiers, said pulse generator being synchronized with the full wave rectified sinusoid applied said controlled rectifiers, said pulse generator providing an output pulse at varying phase points of the full wave rectified sinusoidal voltage applied said controlled rectifiers according to the magnitude of an input voltage applied to said pulse generator; regulation selector means having two inputs and an output, voltage sensing means connected with the input of said inverter and one input of said regulation selector means to provide an input signal to said regulation selector means indicative of the voltage amplitude at the inverter input, tachometer means coupled with said induction motor to provide a signal indicative of the speed of rotation of the rotor of said induction motor, means coupling said tachometer with the other input of said regulation selector means, and means connecting the output of said regulation selector means with the input of said pulse generator to automatically provide an input voltage to said pulse generator determinative of the phase of the output pulse according to either the speed of rotation of the motor's rotor or the amplitude of the voltage applied to the input of the inverter whereby, the output voltages of said commuting power sources are controlled in a generally inverse relation with both the amplitude of said inverter input voltage and the speed of operation of said induction motor.

* * * * *